US012736659B2

(12) United States Patent
Yang et al.

(10) Patent No.: US 12,736,659 B2
(45) Date of Patent: Sep. 15, 2026

(54) DUAL FUNCTION RADIO ACCESS NETWORK NODE WITH WIRELESS COMMUNICATION AND SENSING

(71) Applicant: ZTE Corporation, Shenzhen (CN)

(72) Inventors: Li Yang, Shenzhen (CN); Feng Xie, Shenzhen (CN); Shuqiang Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 334 days.

(21) Appl. No.: 18/488,457

(22) Filed: Oct. 17, 2023

(65) Prior Publication Data

US 2024/0053465 A1 Feb. 15, 2024

Related U.S. Application Data

(63) Continuation of application No. PCT/CN2021/099634, filed on Jun. 11, 2021.

(51) Int. Cl.
*H04W 76/15* (2018.01)
*G01S 13/74* (2006.01)
*H04L 5/00* (2006.01)

(52) U.S. Cl.
CPC ............ *G01S 13/74* (2013.01); *H04L 5/0048* (2013.01); *H04W 76/15* (2018.02)

(58) Field of Classification Search
CPC ... H04W 76/27; H04W 4/40; H04W 36/0069; H04W 24/02; H04W 72/02; H04W 72/0446
USPC ....................................................... 455/456.1
See application file for complete search history.

(56) References Cited

U.S. PATENT DOCUMENTS

| | | | | |
|---|---|---|---|---|
| 10,033,496 | B2 * | 7/2018 | Liu | H04L 5/0023 |
| 11,510,283 | B2 * | 11/2022 | Sadeghi | H04B 7/0452 |
| 11,860,293 | B2 * | 1/2024 | Ying | G01S 13/86 |
| 11,968,733 | B2 | 4/2024 | Basu Mallick et al. | |
| 2008/0130488 | A1 | 6/2008 | Kuo | |
| 2010/0113008 | A1 | 5/2010 | Wang et al. | |

(Continued)

FOREIGN PATENT DOCUMENTS

| | | | | |
|---|---|---|---|---|
| CN | 103314610 A | | 9/2013 | |
| CN | 105208618 A | * | 12/2015 | H04W 76/16 |

(Continued)

OTHER PUBLICATIONS

E. Soltanaghai, "Perceiving the World with Pervasive Wireless Communication Infrastructures," 2022 14th International Conference on COMmunication Systems & NETworkS (COMSNETS), Bangalore, India, 2022, pp. 558-564, doi: 10.1109/COMSNETS53615.2022.9668394 (Year: 2022).*

(Continued)

*Primary Examiner* — William D Cumming
(74) *Attorney, Agent, or Firm* — Crowell & Moring LLP

(57) ABSTRACT

A radio access network ("RAN") node or basestation that includes dual functions with both wireless communications and wireless sensing. The sensing related signal may be integrated in the RAN node to provide sensing operations (e.g. sensing radio link S-RL) in addition to wireless communications (e.g. communication radio link RL) with user equipment ("UE"). The sensing signal can be used for detecting objects along a radio path between the RAN node and UE to improve the wireless communication through the communication radio link.

14 Claims, 12 Drawing Sheets

(56) References Cited

U.S. PATENT DOCUMENTS

| | | | | |
|---|---|---|---|---|
| 2011/0183663 | A1 | 7/2011 | Kenehan et al. | |
| 2013/0095818 | A1 | 4/2013 | Levy et al. | |
| 2017/0180092 | A1* | 6/2017 | Liu | H04L 5/005 |
| 2018/0367266 | A1* | 12/2018 | Liu | H04W 72/0446 |
| 2019/0222330 | A1 | 7/2019 | Shan | |
| 2020/0053824 | A1 | 2/2020 | He | |
| 2020/0305231 | A1* | 9/2020 | Sadeghi | H04B 7/0452 |
| 2020/0333456 | A1* | 10/2020 | Ying | G01S 7/006 |
| 2021/0044945 | A1 | 2/2021 | Ronnau | |
| 2021/0076417 | A1* | 3/2021 | Bayesteh | H04W 76/27 |
| 2021/0105827 | A1 | 4/2021 | Tsai | |
| 2021/0153285 | A1 | 5/2021 | Hu et al. | |
| 2022/0039080 | A1 | 2/2022 | Khoryaev et al. | |
| 2022/0346180 | A1 | 10/2022 | Tseng et al. | |
| 2023/0088597 | A1 | 3/2023 | Alfarhan et al. | |
| 2023/0328683 | A1* | 10/2023 | Zhang | H04W 4/40 455/456.1 |
| 2024/0053465 | A1* | 2/2024 | Yang | G01S 13/765 |
| 2025/0031108 | A1* | 1/2025 | Yang | H04W 36/0069 |
| 2025/0039696 | A1* | 1/2025 | Yang | H04W 24/02 |
| 2026/0082379 | A1* | 3/2026 | Wei | H04W 72/02 |

FOREIGN PATENT DOCUMENTS

| | | | | |
|---|---|---|---|---|
| CN | 106028352 | A | 10/2016 | |
| CN | 109391308 | A | 2/2019 | |
| CN | 109477886 | A | 3/2019 | |
| CN | 110794403 | A | 2/2020 | |
| CN | 111213393 | A | 5/2020 | |
| CN | 111976788 | A | 11/2020 | |
| CN | 117136575 | A * | 11/2023 | H04W 16/14 |
| CN | 119366238 | A * | 1/2025 | H04W 36/0085 |
| CN | 120378068 | A * | 7/2025 | H04W 52/242 |
| JP | 2025511644 | A * | 4/2025 | H04W 4/38 |
| KR | 20230159868 | A * | 11/2023 | H04W 64/00 |
| KR | 20240154645 | A * | 10/2024 | H04W 4/38 |
| WO | WO-2025148959 | A1 * | 7/2025 | H04W 52/242 |

OTHER PUBLICATIONS

English-language Search Report issued in European Application No. 21944610.1 dated Dec. 2, 2024, (13 pages).

International Search Report and Written Opinion received for Application No. PCT/CN2021/099634 mailed Feb. 28, 2022 (7 pages).

ZTE et al. "Sensing based schemes for cross-link interference mitigation in NR" 3GPP TSG RAN WG1 AH_NR#1 Meeting R1-1700272, Jan. 20, 2017 (5 pp.).

Extended European Search Report issued in European application No. 21944600.2, dated Jul. 5, 2024, 7 pages.

U.S. Non-Final Office Action issued in U.S. Appl. No. 18/237,005 dated Jun. 23, 2026 (24 pages).

* cited by examiner 100
104
104
102
102
Basestation
102
Core Network
110
System Circuitry
122
Tx / Rx Circuitry
113
2G / 3G / 4G / LTE / 5G
Network Interface Circuitry
116
Processor(s)
124
Memory
126
Control parameters
130
Operations
128

200
104
19
25
Chicago
Blizzard
Feb 1, 2014
30°
System
Power
282
Battery
254
RACH / DCI
252
102
Communication Interfaces
212
Tx / Rx Circuitry
BT / WLAN / NFC
2G / 3G / 4G / LTE / 5G
230
Antenna(s)
232
System Circuitry
214
Input / Output
228
SIM Card 1 Interface
206
202
210
Processor(s)
216
Memory
220
Control Instructions
222
Control Parameters
224
User Interface
218
GUI 1202
RAN node sends sensing signal
1204
UE receives sensing signal
1206
UE responds to sensing signal with one or more echo signals
1208
RAN node analyzes echo signal(s)
Adjust communication RL based on analysis
1210
Provide echo signal(s) or analysis to upper layer or 3rd party
1212
Determine environment
1214
Manage promotions
1216

DUAL FUNCTION RADIO ACCESS NETWORK NODE WITH WIRELESS COMMUNICATION AND SENSING

PRIORITY

This application claims priority as a Continuation to PCT/CN2021/099634, filed on Jun. 11, 2021, published as WO 2022/257101 A1, entitled "DUAL FUNCTION RADIO ACCESS NETWORK NODE WITH WIRELESS COMMUNICATION AND SENSING", the entire disclosure of which is herein incorporated by reference.

TECHNICAL FIELD

This document is directed generally to wireless communications. More specifically, a radio access network ("RAN") node includes dual functions with both wireless communications and integrated wireless sensing.

BACKGROUND

Wireless communication technologies are moving the world toward an increasingly connected and networked society. Wireless communications rely on efficient network resource management and allocation between user mobile stations and wireless access network nodes (including but not limited to radio access network ("RAN") nodes and wireless basestations). A new generation network is expected to provide high speed, low latency and ultra-reliable communication capabilities and fulfil the requirements from different industries and users. User mobile stations or user equipment ("UE") are becoming more complex and the amount of data communicated continually increases. With the development of more advanced radar and sensing systems, communications between with the UE can be modernized.

SUMMARY

This document relates to methods, systems, and devices for a radio access network ("RAN") node or basestation that includes dual functions with both wireless communications and wireless sensing. The sensing related signal may be integrated in the RAN node to provide sensing operation (e.g. sensing radio link S-RL) in addition to wireless communications (e.g. communication radio link RL) with user equipment ("UE"). The sensing signal can be used by the RAN node and/or the UE for detecting objects along a radio path between the RAN node and UE to improve the wireless communication through RL.

In one embodiment, a method for wireless sensing includes transmitting a sensing signal for providing a sensing purpose, and providing a sensing radio link for the wireless sensing operation. The providing is by a radio access network ("RAN") node and the sensing radio link is configured with a user equipment ("UE"). The method includes receiving an echo signal in response to the sensing signal. The echo signal is sent from the UE and is processed by the UE locally before responding. The processing by the UE includes at least one of reflecting the signal immediately, identifying and then reflecting the signal, or identifying, evaluating and then reflecting the signal. The RAN node configures the UE with dual functions of wireless communication via a communication radio link ("RL") and wireless sensing via a sensing radio link ("S-RL"), wherein the RL and the S-RL are simultaneous. The communication radio link and the sensing radio link utilize the same physical resources, such that the sensing and/or echo signal are physically integrated with a parallel communication signal when the UE is in a connected state. The communication radio link and the sensing radio link utilize different physical resources, such that the sensing and/or echo signal are physically separated from a parallel communication signal. The transmitting and the providing are independent of an RRC state of the UE for a communication purpose. The sensing radio link is configured with the UE for providing the UE's environmental or context details to the RAN node for improving an ongoing or upcoming wireless communication. Different sensing signals are used for different sensing purposes.

In another embodiment, a method for wireless sensing includes receiving a sensing signal for a sensing purpose, transmitting an echo signal in response to receipt of the sensing signal, and establishing a sensing radio link for the wireless sensing operation. The receiving and the transmitting is by a user equipment ("UE") and the sensing radio link is established with a basestation, wherein the UE is subject to preconfiguration by the basestation. The UE is configured by the basestation with dual functions of wireless communication via a communication radio link ("RL") and wireless sensing via a sensing radio link ("S-RL"), wherein the RL and the S-RL are simultaneous. The communication radio link and sensing radio link utilize the same physical resources, such that the sensing and/or echo signal are physically integrated with a parallel communication signal. The communication radio link and sensing radio link utilize different physical resources, such that the sensing and/or echo signal are physically separated from a parallel communication signal. The sensing radio link and the communication radio link are independent of a RRC state of the UE for communication purpose. The sensing radio link is configured by basestation for providing target UE's environmental or context details to the basestation for improving the ongoing or upcoming wireless communication between the UE and the basestation. The method includes processing, after receiving the sensing signal, the sensing signal by either being reflected immediately, or identifying and then reflecting the sensing signal, or by identifying, evaluating and then reflecting the sensing signal subject to a preconfiguration by the basestation.

In another embodiment, a method for wireless sensing includes sending, by a radio access network ("RAN") node, a sensing signal to a user equipment ("UE"), and sending, by the RAN node, a communication signal to the UE for the wireless communication. The RAN node is configured for dual functions of the wireless communication with the UE and for sensing by the sensing signal.

In another embodiment, a method for wireless communication includes receiving, by a user equipment ("UE"), a sensing signal from a radio access network ("RAN") node, sending, by the UE, an echo signal to the RAN node in response to the sensing signal, and communicating, by the UE, with the RAN node for the wireless communication. The RAN node is configured for dual functions of the wireless communication with the UE and for sensing by the sensing signal.

In another embodiment, a dual function basestation includes a sensing capability configured for providing a sensing signal, and a communication capability configured for providing a communication signal. The communication signal is provided to a user equipment ("UE") for establishing wireless communication with the UE.

In another embodiment, a dual function user equipment ("UE") includes a sensing response capability configured for providing an echo signal in response to a sensing signal, and a communication capability for providing a communication signal. The communication signal is provided to a basestation for establishing wireless communication with the basestation.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
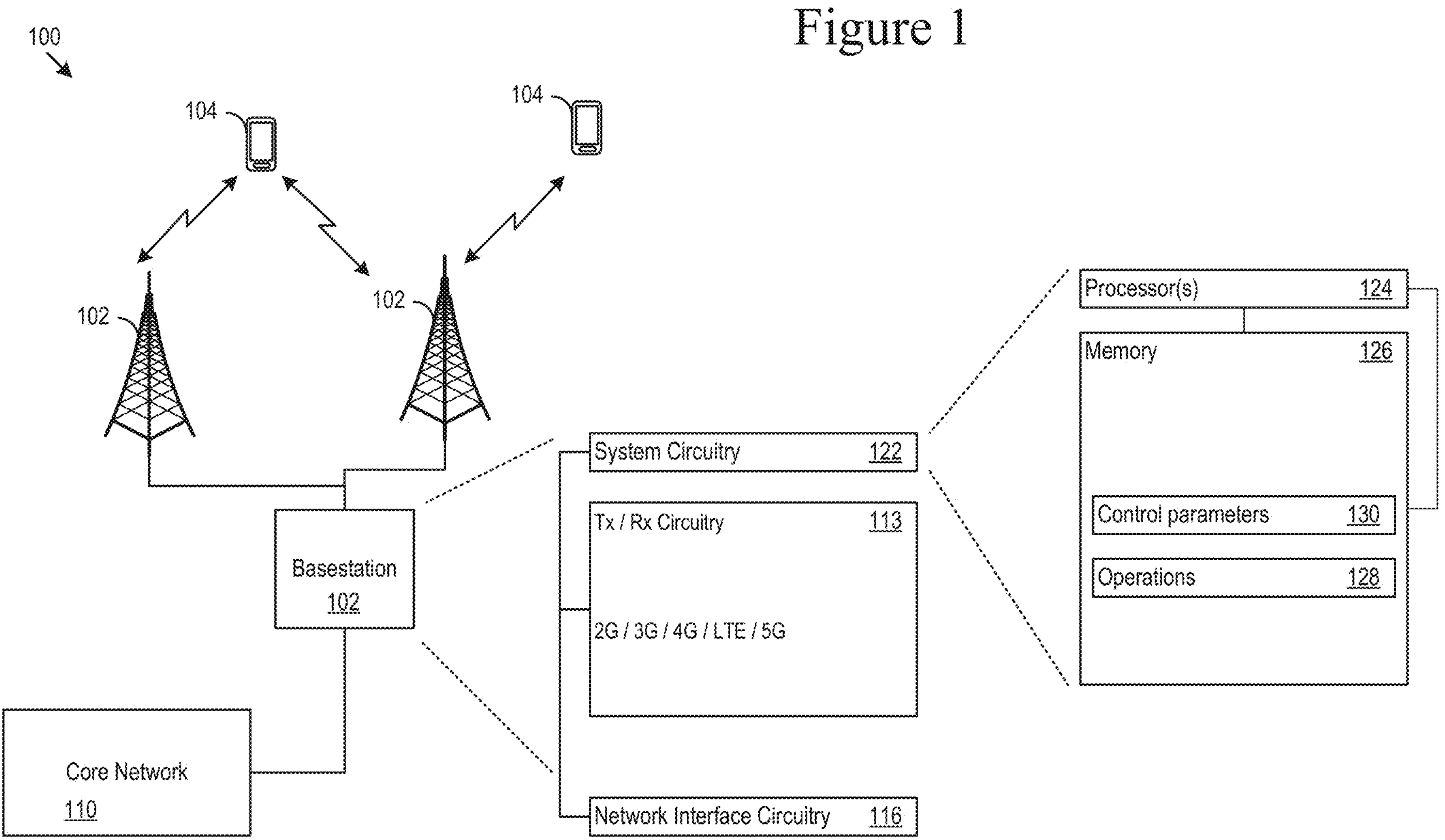
FIG. 1 shows an example basestation.
Figure 2:
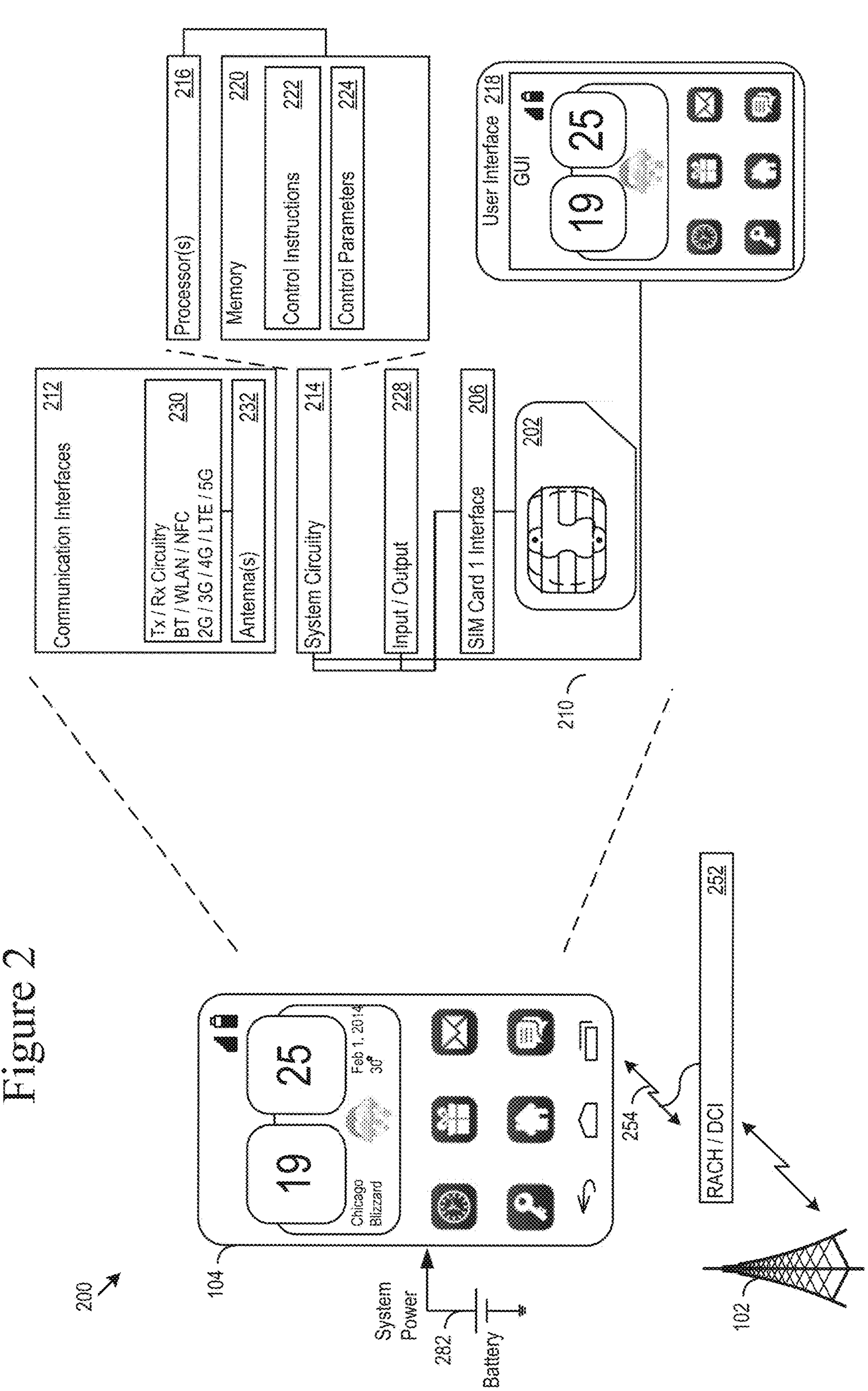
FIG. 2 shows an example random access (RA) messaging environment.

Radio resource control ("RRC") is a protocol layer between UE and the basestation at the IP level (Radio Network Layer). There may be various Radio Resource Control (RRC) states, such as RRC connected (RRC_CONNECTED), RRC inactive (RRC_INACTIVE), and RRC idle (RRC_IDLE) state. RRC messages are transported via the Packet Data Convergence Protocol ("PDCP"). UE can transmit infrequent (periodic and/or non-periodic) data in RRC_INACTIVE state without moving to an RRC_CONNECTED state. This can save the UE power consumption and signaling overhead. This can be through a Random Access Channel ("RACH") protocol scheme or a Configured Grant ("CG") scheme. The wireless communications described herein may be through radio access. In addition, the embodiments described include sensing communications or sensing signals, which are either physically different from wireless communications or logically different from wireless communications. FIGS. 1-2 show example radio access network ("RAN") nodes (e.g. basestations) and user equipment and messaging environments, which may be applicable to both the wireless communications and sensing communications. A single RAN node is able to provide both wireless communication and wireless sensing capabilities and services more flexibly and efficiently as described herein.

In some wireless communication systems (such as 4G-LTE and 5G-NR), the RAN node may transmit downlink pilot reference signals such as SSB, CSI-RS etc., and the UE receives, measures and processes them so that UE knows the connection quality of the communication radio link ("RL"). This may be conducted between a serving RAN node and the UE in order to maintain mobility and service continuity. The "UE based measurement&report" is one example of sensing configured by network. However, there can be more and different measuring&sensing&report examples between the network and the UE. The network and the UE can measure, detect and sense objects other than pilot reference signals for communications. The sensing may allow for the measure, detection and sensing of a UE's local environments and a UE's resource utilization context. Sensing results may be provided to the UE's serving RAN node, so the serving RAN node can know the UE's local environment and resource utilization context, and dynamically improve the connection quality of the communication RL with the UE.

In one example, in the mmWave (e.g. above 6 GHz) communication context, due to bigger path-loss and vulnerable mmWave channel conditions in the high frequency band, the human user's body and hand gestures may impose adverse disadvantages towards UE wireless communications, such as sheltering and interfering with the RL. Previously, the serving RAN node would rely on other reactive mechanisms to boost the quality of RL, which are often not quick or prompt enough, as they rely on the time consuming activities on UE side. With the integrated wireless communication and sensing system in a dual functional RAN node, the serving RAN node may sense and detect the human user body and hand gestures based on either radar type techniques (with a sensing signal) that is identified much more quickly in advance, so the serving RAN node can take proactive actions to boost the quality of the communication RL.

FIG. 1 shows an example ("RAN") node or basestation 102. The RAN node may also be referred to as a wireless network node. The RAN node 102 may be further identified to as a nodeB (NB, e.g., an eNB or gNB) in a mobile telecommunications context. The example RAN node may include radio Tx/Rx circuitry 113 to receive and transmit with user equipment (UEs) 104. The RAN node may also include network interface circuitry 116 to couple the RAN node to the core network 110, e.g., optical or wireline interconnects, Ethernet, and/or other data transmission mediums/protocols.

The RAN node may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the RAN node. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a RAN node 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth® connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Figure 3A:
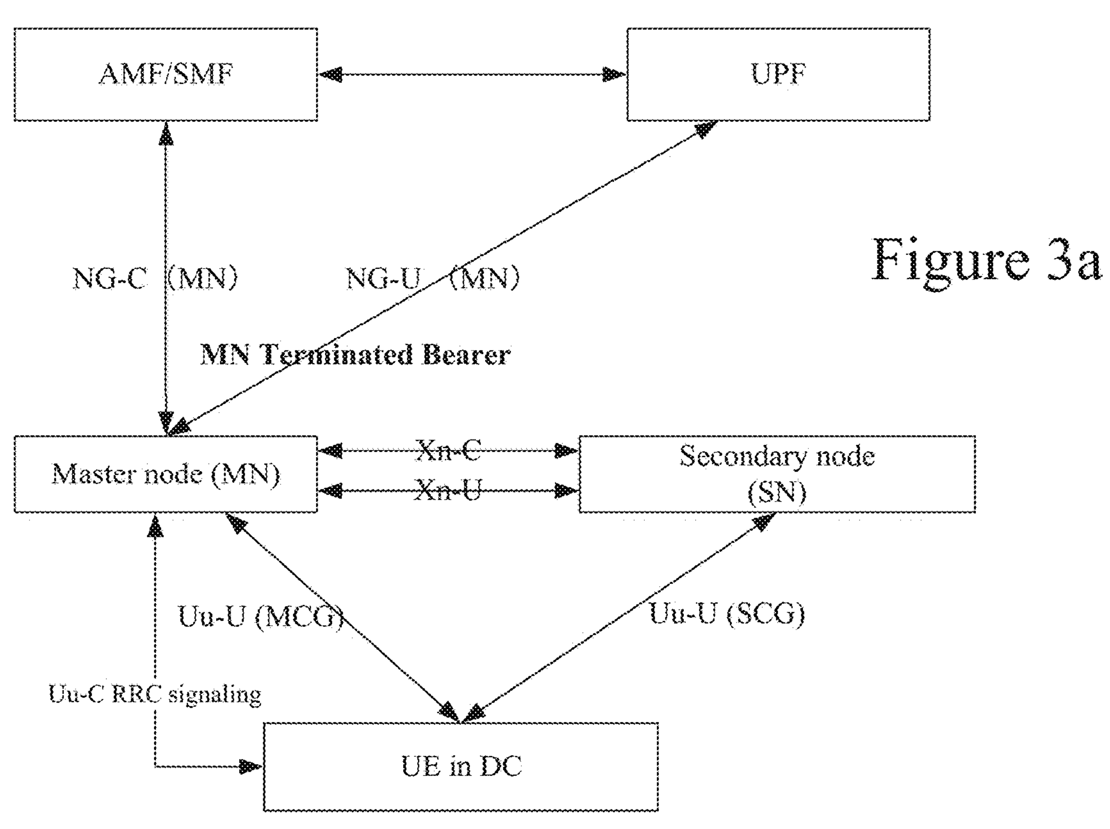
FIGS. 3*a* and 3*b* shows communication with a master node and secondary node that are not located together.
Figure 3B:
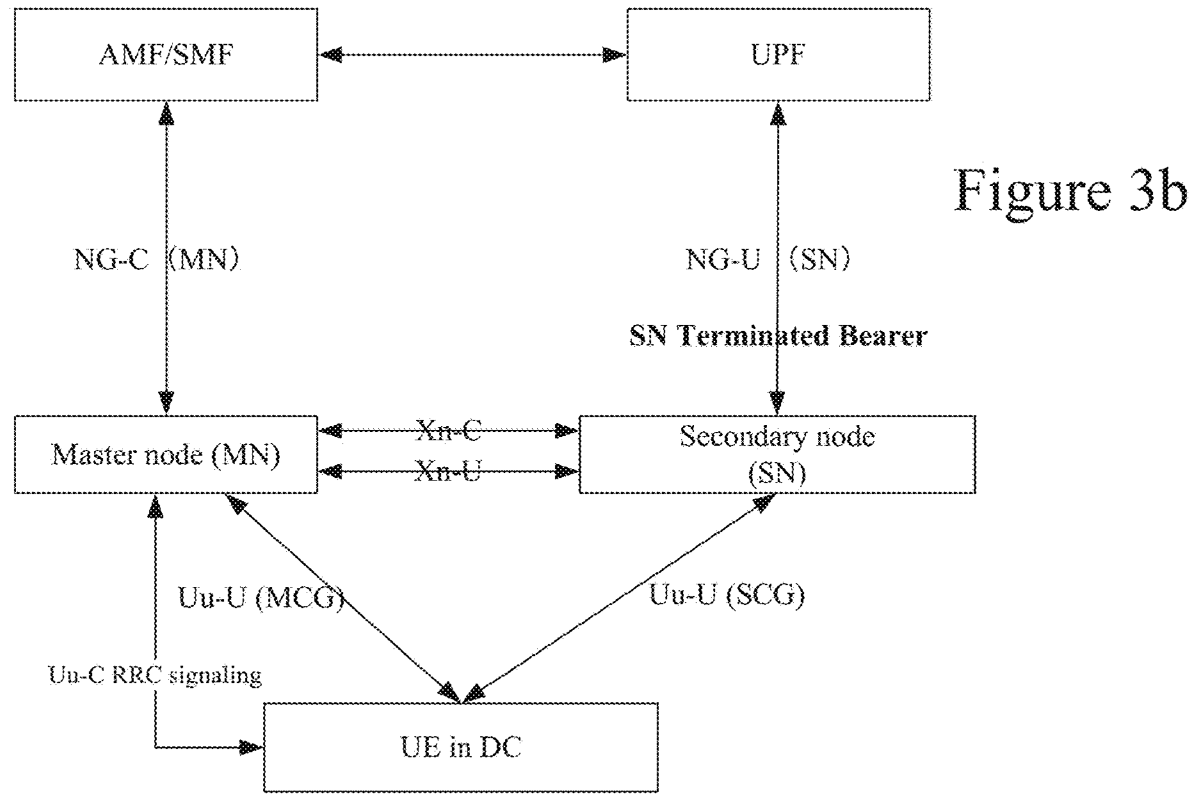

FIGS. 3*a* and 3*b* shows communication with a master node and secondary node that are not located together.

Multiple RAN nodes of same or different radio access technology ("RAT") (e.g. eNB, gNB) can be deployed in the same or different frequency carriers in certain geographic areas, and they can inter-work with each other via a dual connectivity operation to provide joint communication services for the same target UE(s). The multi-RAT dual connectivity ("MR-DC") architecture with non-co-located master node ("MN") and secondary node ("SN") is shown in FIGS. 3*a* and 3*b*. Access Mobility Function ("AMF") and Session Management Function ("SMF") are the control plane entities and User Plane Function ("UPF") is the user plane entity in new radio ("NR") or SGC. The signaling connection between AMF/SMF and MN is a Next Generation-Control Plane ("NG-C")/MN interface. The signaling connection between MN and SN is an Xn-Control Plane ("Xn-C") interface. The signaling connection between MN and UE is a Uu-Control Plane ("Uu-C") RRC interface. All these connections manage the configuration and operation of MR-DC. FIG. 3*a* dhows the user plane connection between UPF and MN is NG-U(MN) interface instance, which corresponds to MN terminated bearer. FIG. 3*b* shows the user plane connection between UPF and SN is NG-U(SN) interface, which corresponds to SN terminated bearer. The user plane connection between MN and SN is Xn-User Plane ("Xn-U") interface, which corresponds to split bearer. The user plane connection between MN and UE is Uu-U(MCG) interface instance (providing master RL) and the user plane connection between SN and UE is Uu-U(SCG) interface instance (providing secondary RL). These user plane connections support the user data transfer of MR-DC. From network perspective, MN provides communication service via local processing effort inside MN and MCG resources over Uu-U (MCG); while SN provides communication service in parallel via local processing effort inside SN and SCG resources over Uu-U(SCG) towards the same target UE. There are two separate and independent RLs (master RL and secondary RL).

Figure 3C:
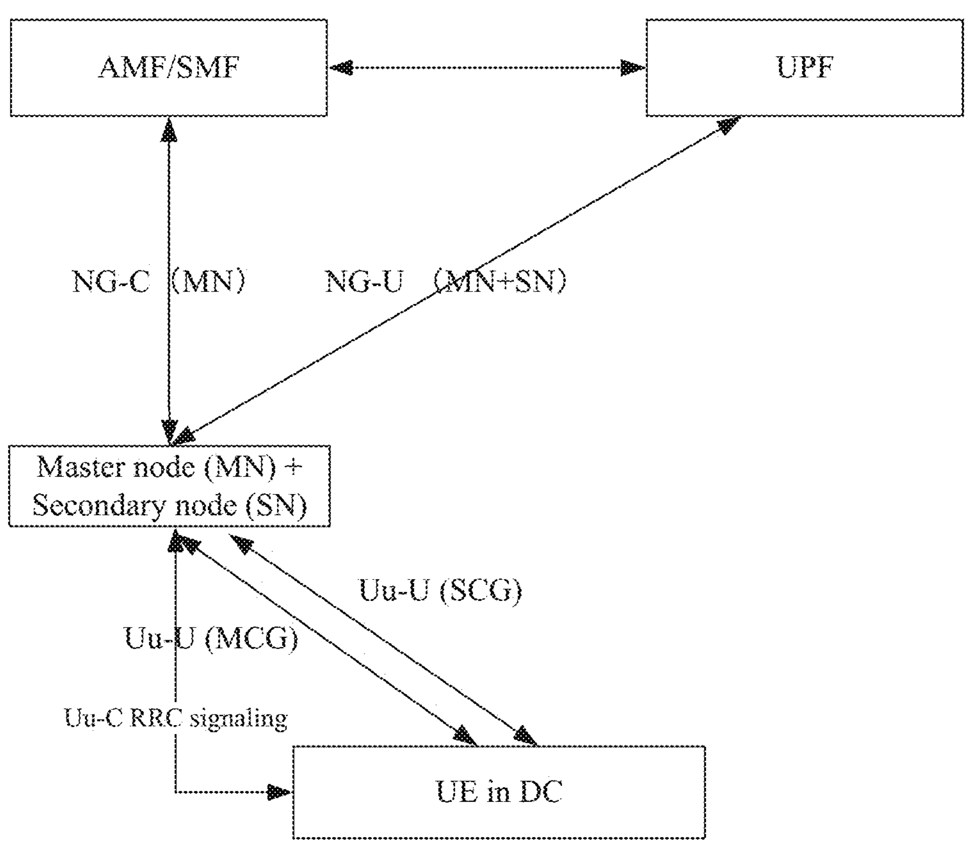
FIG. 3*c* shows communication with a master node and secondary node that are co-located.

FIG. 3*c* shows communication with a master node and secondary node that are co-located. The MR-DC Architecture with co-located MN and SN is shown in FIG. 3*c*. Logically, the MN and SN still exist but physically they are now implemented in the same RAN node, so the external Xn interface instance in FIGS. 3*a*-3*b* between MN and SN are not needed, and the MN and SN coordinate with each other in an internal interface. There are also two separate and independent RLs (master RL and secondary RL). The single MR-DC functional RAN node shown in FIG. 3*c* logically integrates primary/master wireless communication RL and secondary wireless communication RL towards the same target UE. From the MR-DC functional UE perspective, it logically integrates and maintains two separate and independent RLs over the air. Those two RLs may be of the same or different RATs or frequency carriers. This operation of a dual function RAN node applies to the integration of wireless communication and wireless sensing shown in FIG. 4. This dual functional RAN node can provide both wireless communication and wireless sensing services towards the same target UE(s).

Figure 4:
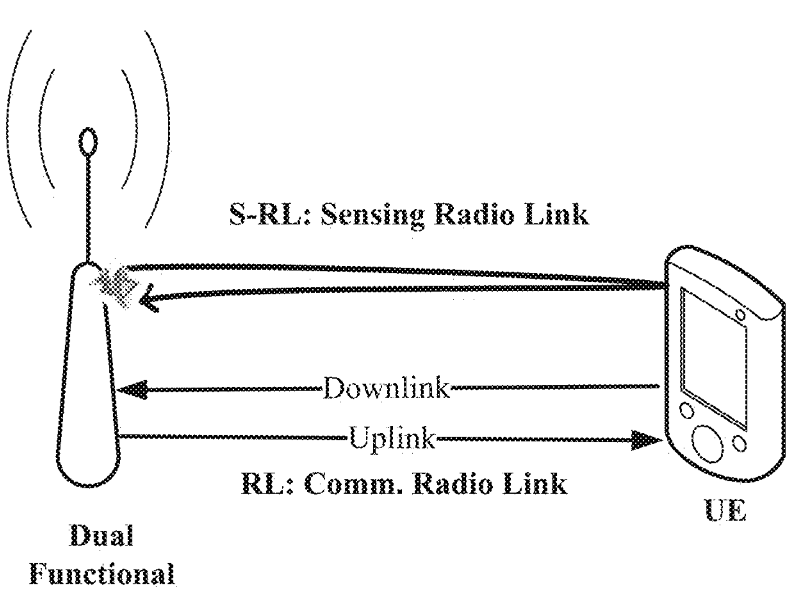
FIG. 4 shows a dual function radio access network ("RAN") node that communicates with user equipment ("UE") through the dual functional links.

FIG. 4 shows a dual function radio access network ("RAN") node that communicates with user equipment ("UE") through the dual functional links. One of the dual functions is wireless communication and the other is sensing communication. Wireless communication includes at least one radio link ("RL") for transmitting and receiving (signaling and/or user) data over the air between the RAN node and the UE. Wireless sensing or sensing communication includes a sensing radio link ("S-RL"). The S-RL is setup and used to sense and detect something along a radiation path over the air between the RAN node and the UE. The sensing radio link ("S-RL") is a logic radio link not used for the purpose of transmitting and receiving (signaling and/or user) data over the air, but is used for the purpose of sensing and detecting something along the radiation path over the air. The dual function RAN node includes a single RAN node which can perform both wireless communication and wireless sensing operations with the target UE. Specifically, FIG. 4 illustrates the dual function RAN node sends a sensing radio link ("S-RL") to the UE, which then returns a signal (e.g. an echo signal/response) to the RAN node. In addition to the sensing communication of the S-RL, the dual function RAN node has a communication radio link ("RL"). The RL is a downlink from the UE to the RAN node and an uplink from the RAN node to the UE. As shown in FIG. 4, the dual function RAN node can setup and maintain both S-RL and RL with the target UE simultaneously. For the handling of communication RL, it may be the same as legacy systems (e.g. following the specifications of 4G-LTE or 5G-NR).

Figure 5:
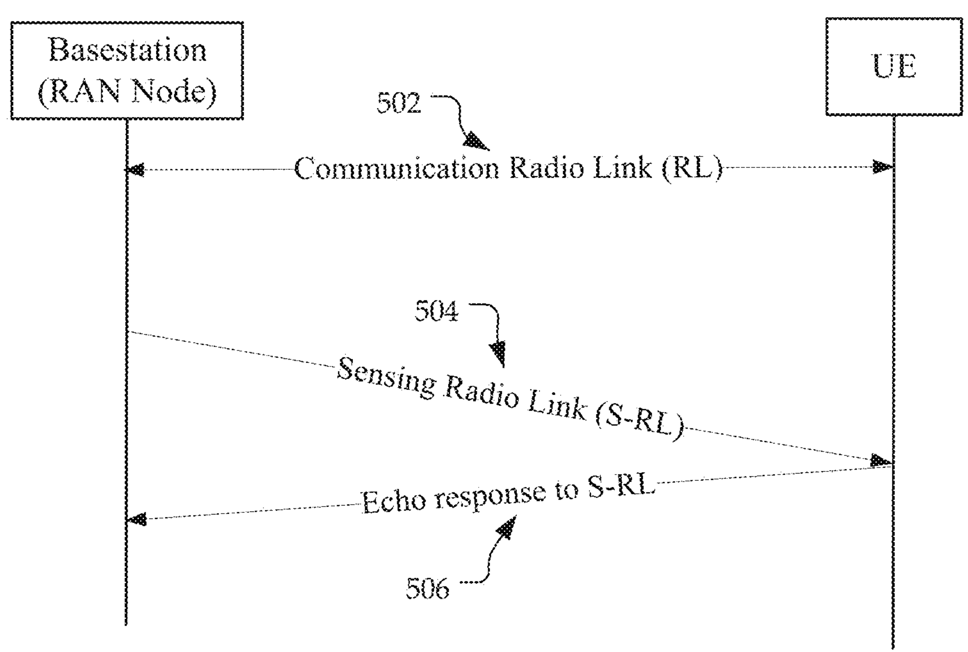
FIG. 5 shows a communication diagram with a dual function RAN node communication with a communication radio link ("RL") and a sensing radio link ("S-RL").

FIG. 5 shows a communication diagram with a dual function RAN node communication with a communication radio link ("RL") and a sensing radio link ("S-RL"). The RAN node (also referred to as a basestation) establishes a communication RL 502 with the UE. In addition, the second function of the RAN node provides an S-RL 504 to the UE. In response to the S-RL 504, the UE provides a response 506. The response 506 may be referred to as an echo signal that transmitted by the UE in direct response to receipt to the S-RL 504.

S-RL may be a logically separated radio link from the communication RL, but physically S-RL may share the same or use different air/radio resources (e.g. time/frequency/space/code etc.) from the communication RL's. FIG. 5 shows an example of using different air/radio resources, the radio signal between RAN node and UE carries either the data information or the sensing related information, but not both simultaneously.

Figure 6:
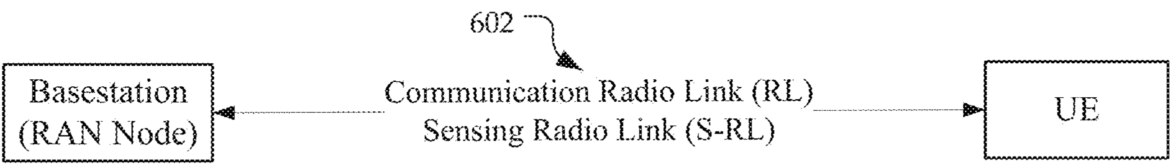
FIG. 6 shows a communication diagram with a combined communication radio link and a sensing radio link.

FIG. 6 shows a communication diagram with a combined communication radio link and a sensing radio link. Sharing the same air/radio resources means the same radio signal between RAN node and UE carries both the data (signaling and/or user data) and sensing related signal simultaneously. FIG. 6 illustrates a single signal 602 that includes both wireless communication and sensing communication.

Figure 7:
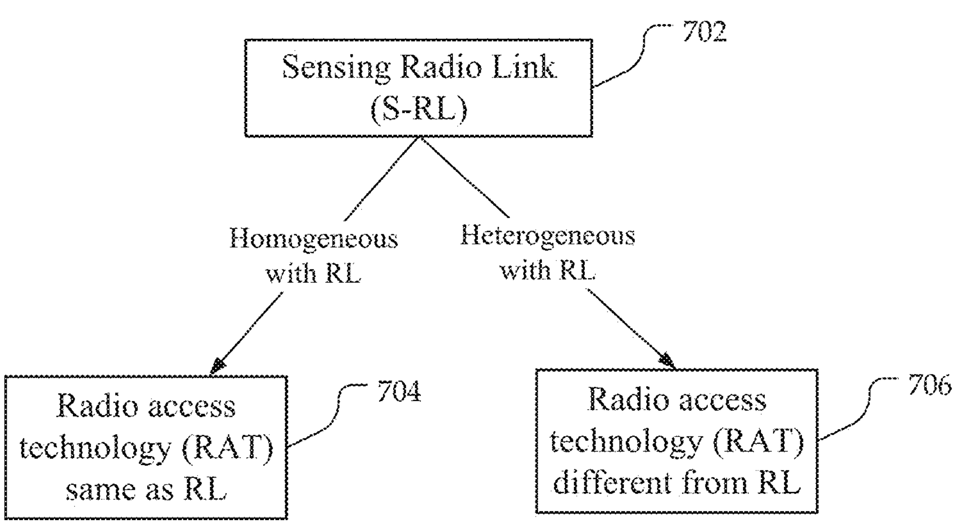
FIG. 7 shows the radio access technology ("RAT") options for the sensing radio link ("S-RL").

FIG. 7 shows the radio access technology ("RAT") options for the sensing radio link ("S-RL") 702. S-RL can be implemented via the same or different radio access techniques/technology ("RAT"). The S-RL 702 may have the same RAT as RL 704 or may have different RAT from the RL 706. Example of RAT include (de)multiplex, (sub)frame structure, (de)modulation, waveform from the communication RL. For the same RAT 704, the S-RL and RL are homogeneous. For the different RAT, the S-RL and RL are heterogeneous. The dual function RAN node may support both homogeneous and heterogeneous S-RL.

Figure 8:
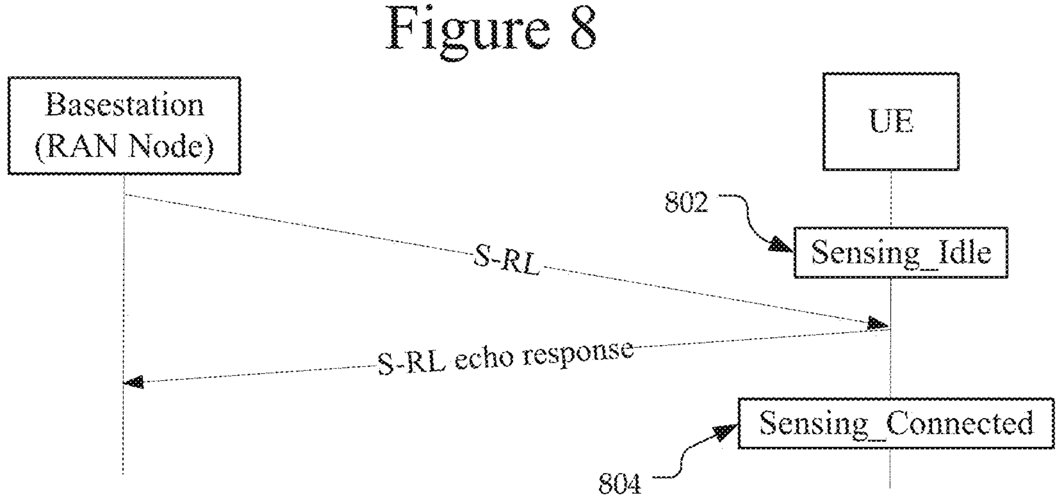
FIG. 8 shows the sensing states for user equipment ("UE") for sensing communications.

FIG. 8 shows the sensing states for user equipment ("UE") for sensing communications. S-RL can be setup and maintained regardless of the UE radio resource channel ("RRC") state. Further, S-RL can be maintained regardless of the existence of a communication RL. In other words, the UE can have a standalone S-RL even in an RRC_IDLE state. If UE has a valid S-RL for particular sensing purpose, then we say UE may be in a Sensing Connected state, otherwise it is in Sensing_Idle state. The UE sensing state is independent from UE RRC state. In FIG. 8, the RAN node provides S-RL to the UE, which was in the Sensing_Idle state 802 before the S-RL signal arrived. After the S-RL and the S-RL echo response, the UE is in the Sensing Connected state 804.

Figure 9:
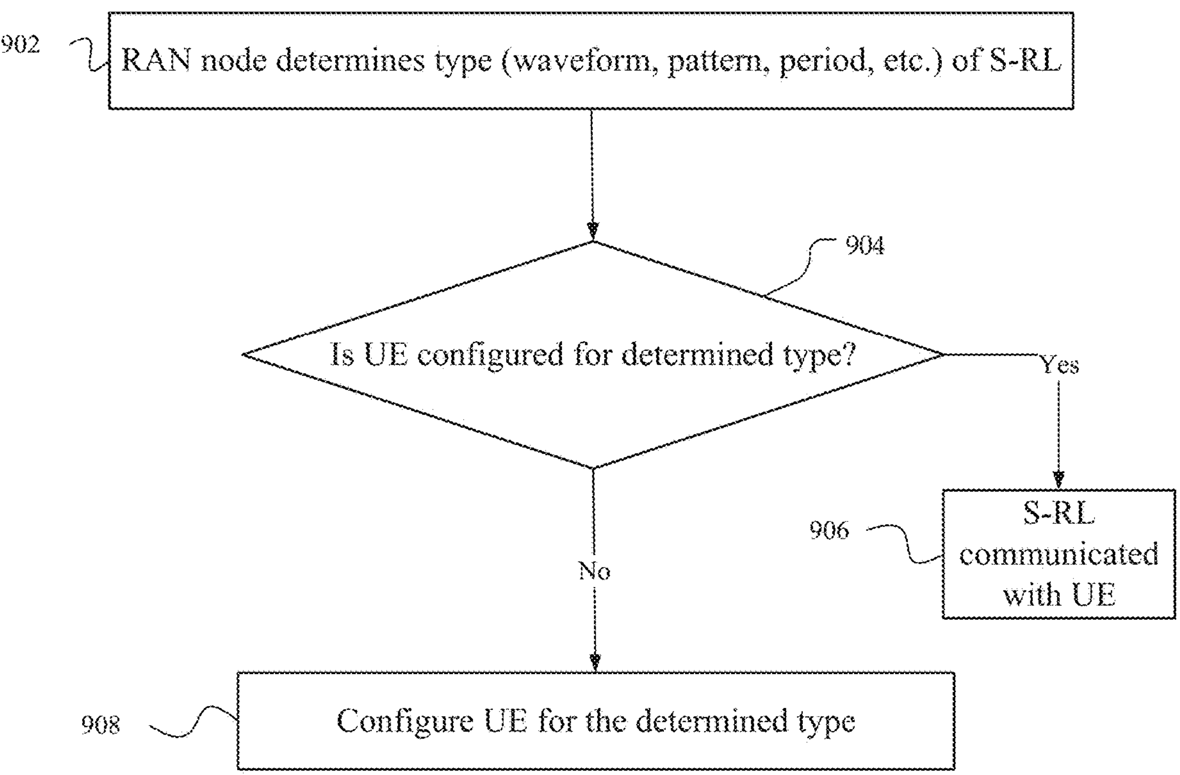
FIG. 9 shows an example process for sensing signal types and user equipment ("UE") configuration.

FIG. 9 shows an example process for sensing signal types and user equipment ("UE") configuration. The dual function RAN node transmits the sensing signal in specified manner via downlink S-RL towards a target UE, and then expects to receive a corresponding echo signal via uplink S-RL from the target UE. The dual function RAN node can transmit different types (e.g. waveform/pattern/period etc.) of sensing signals for different sensing purposes. A determination or selection of type of sensing signal is made by the dual functional RAN node in block 902. In block 904, a determination is made as to whether the UE is configured for the determined type of S-RL from block 902. When the UE is configured for the determined type of S-RL in block 904, the S-RL is communicated with the UE in block 906. When the UE is not configured for the determined type of S-RL in block 904, the UE is configured for the determined type in block 908. The dual function RAN node can configure the target UE with the type of sensing signal to be transmitted.

Figure 10:
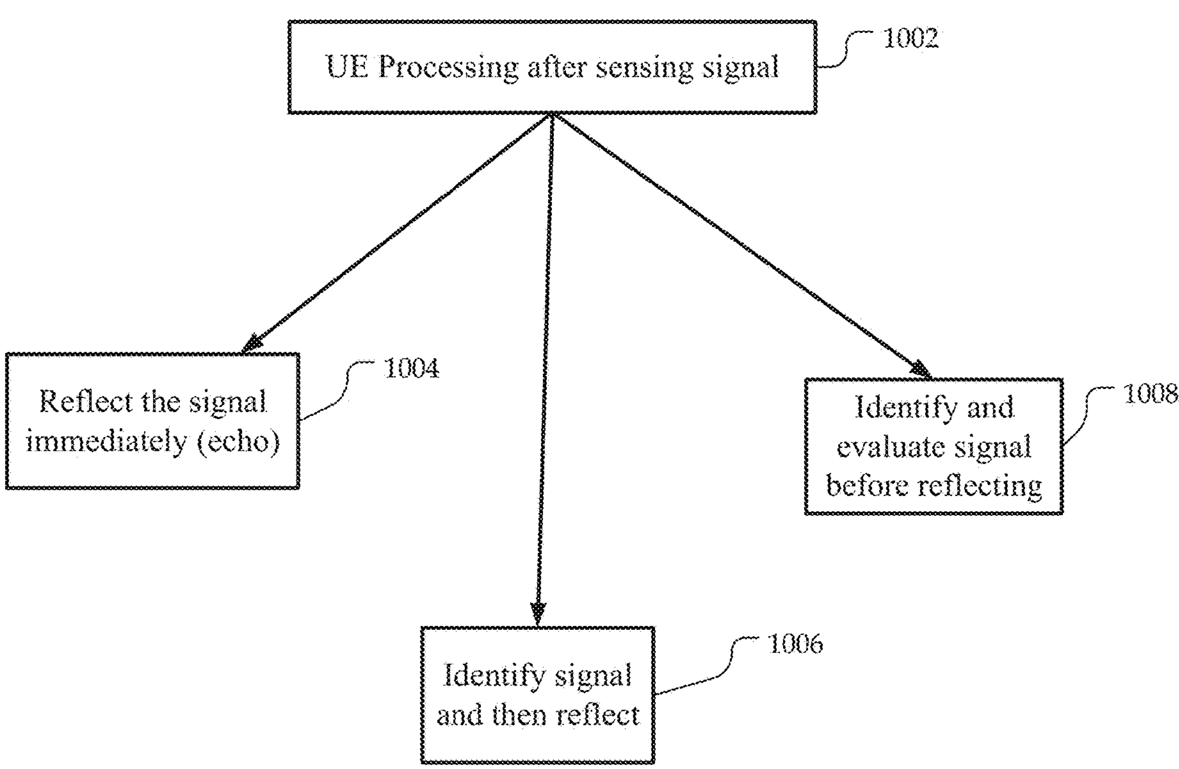
FIG. 10 shows example options for user equipment ("UE") processing of a sensing signal.

FIG. 10 shows example options for user equipment ("UE") processing of a sensing signal. The UE receives the sensing signal via downlink S-RL as configured by the network, and processes the sensing signal in block 1002. FIG. 10 illustrates examples of the processing by the UE after the sensing signal. In block 1004, the UE reflects the sensing signal immediately as configured by network. This reflection may be referred to as an echo response and has the least latency. In block 1006, the UE identifies the sensing signal first and then reflects it as configured by network. This has less latency, but more than the processing in block 1004. In block 1008, the UE identifies and evaluates the sensing signal first and then sends the echo signal as configured by network. This may have slightly more latency, but is still quicker than normal uplink data transmission (communication RL).

FIGS. 11*a*-11*d* shows example sensing signal pulse options from the UE. Specifically, the UE transmits the echo signal via uplink S-RL differently in FIGS. 11*a*-11*d* based on the number of pulses/shots that are transmitted.

Figure 11A:
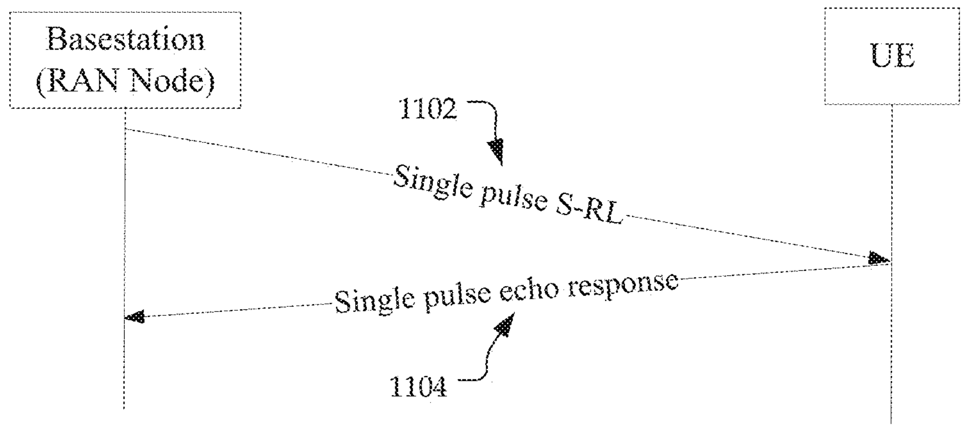
FIGS. 11*a*-11*d* shows example sensing signal pulse options.

FIG. 11*a* illustrates a single pulse S-RL 1102 from the RAN node to the UE and a single pulse echo response 1104 from the UE. This embodiment is a one shot echo signal in response to a one shot sensing signal as configured by network.

Figure 11B:
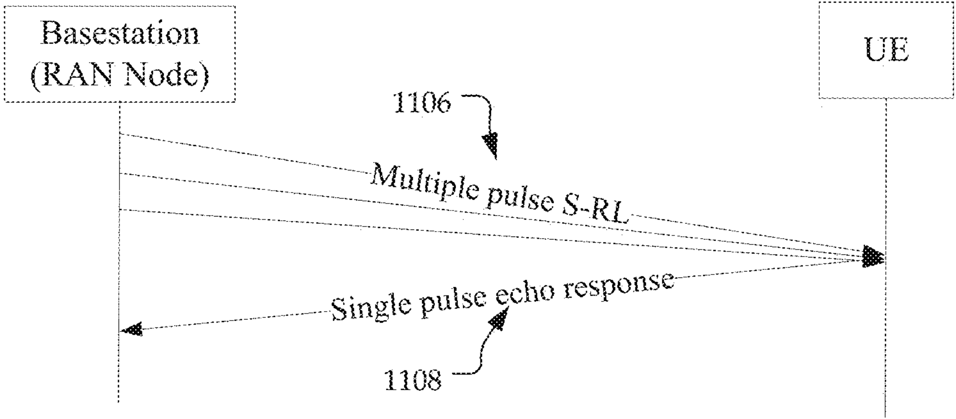

FIG. 11*b* illustrates a multiple pulse S-RL 1106 from the RAN node to the UE and a single pulse echo response 1108 from the UE. The one shot echo signal is in response to a multiple shots sensing signal as configured by network.

Figure 11C:
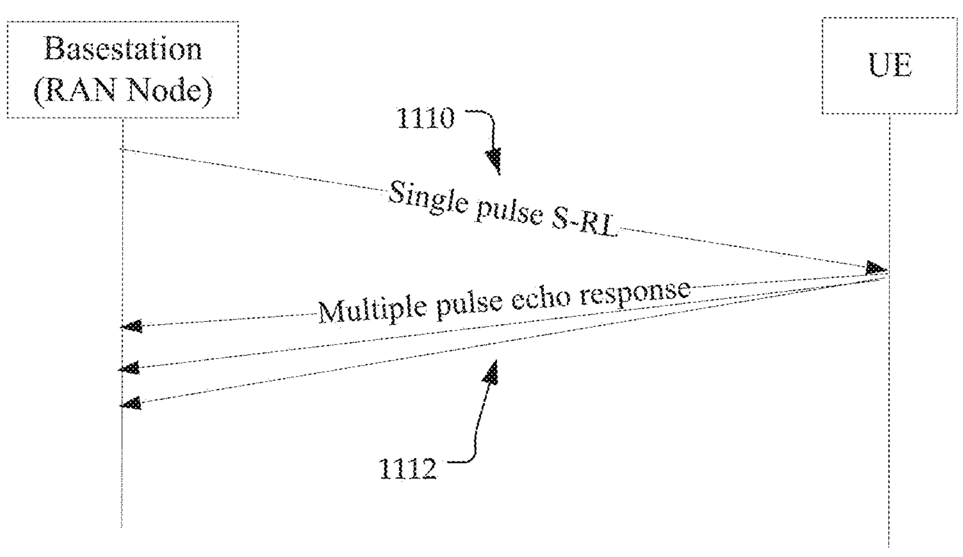

FIG. 11*c* illustrates a single pulse S-RL 1110 from the RAN node to the UE and a multiple pulse echo response 1112 from the UE. The multiple shots echo signal is in response to a one shot sensing signal as configured by network.

Figure 11D:
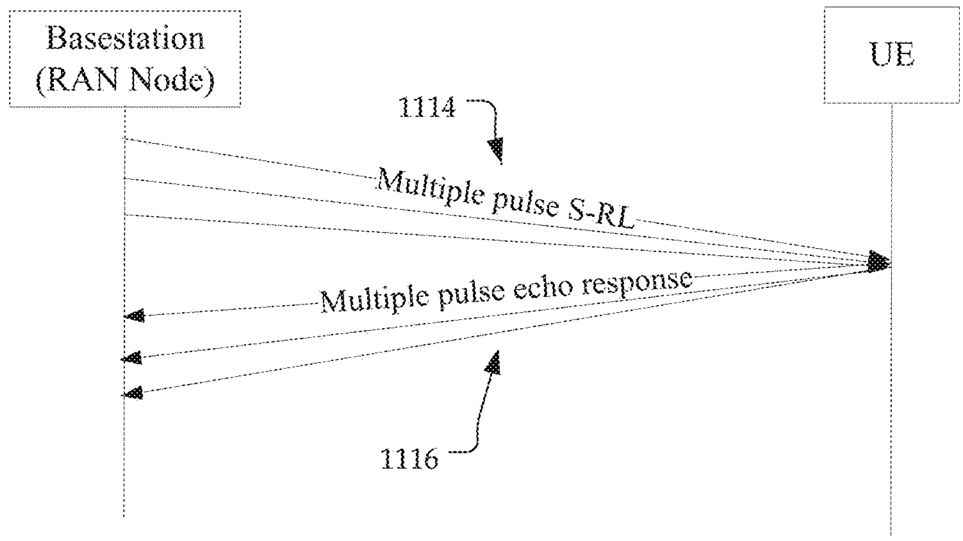

FIG. 11*d* illustrates a multiple pulse S-RL 1114 from the RAN node to the UE and a multiple pulse echo response 1116 from the UE. The multiple shots echo signal is in response to a multiple shots sensing signal as configured by network.

Figure 12:
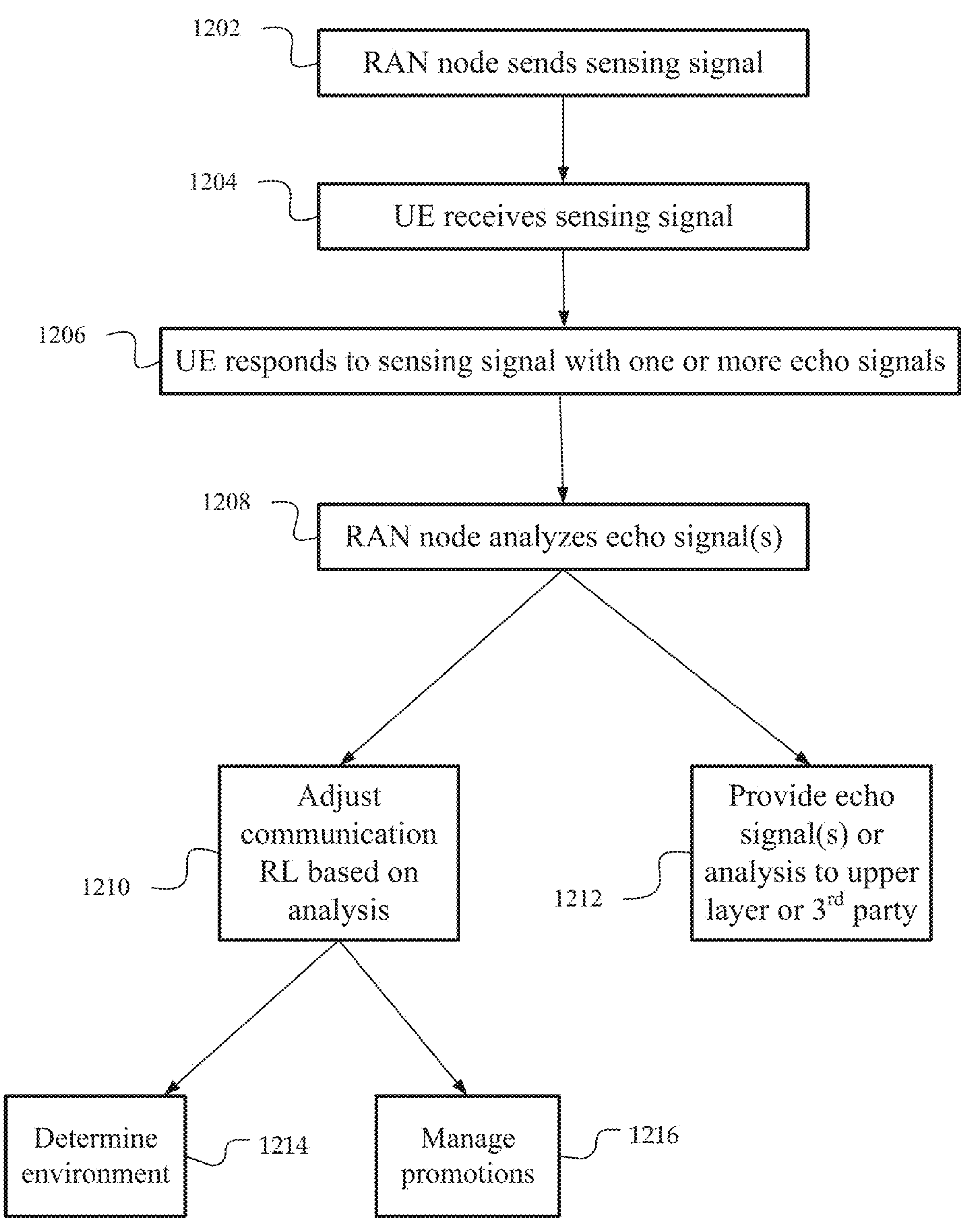
FIG. 12 shows an example process for sensing communication processing.

FIG. 12 shows an example process for sensing communication processing. In block 1202, the RAN node sends a sensing signal. The UE receives the sensing signal from the RAN node in block 1204. The UE responds to the sensing signal with one or more echo signals in block 1206. The RAN node then analyzes the echo signal(s) in block 1208. The analysis is performed upon receiving the corresponding echo signal(s) via uplink S-RL from the target UE. Specifically, the dual function RAN node further analyzes and derives out the sensing (intermediate) results based on those received echo signal(s). In block 1210, the sensing (intermediate) results can be used to assist the management of a parallel communication RL, or to prepare for a potential forthcoming communication RL when needed. The communication RL modification or preparation in block 1210 may include the sensing (intermediate) results being delivered to upper layer or for 3rd party usage in block 1212.

The communication RL modification or preparation in block 1210 may include either determining an environment in block 1214 or managing promotions in block 1216. Based on the obstacles identified by the sensing signal between the RAN node and the UE, the UE's environment may be inferred. Example environments include an indoor environment, a stadium environment, a moving vehicle environment, or a shopping mall environment. In a shopping mall environment, an advertising promotion may be targeted that includes providing targeted information to specific buyers based on advertising promotions for different sellers. The dual functional RAN node may use detect UE's presence in a particular shopping room based on the S-RL to improve the advertising promotion for different sellers. For example, it may include starting broad/multi-casting specific info with Multicast Broadcast Service ("MBS") function.

Example 1

Below is a first example use case of a dual function RAN node. The dual function RAN node supports wireless communication at 45 GHz and wireless sensing at 60 GHz, both in mmWave high frequency bands. The target UE is in an RRC_Connected state (signifying ongoing data transfer) and in an indoor environment, so various indoor obstacles and a user's gesture may cause interference to the existing communication RL at 45 GHz. In order to improve communications by better managing the serving beams (e.g. provide more reliable and efficient beams in time), the dual functional RAN node configures and activates the sensing function at 60 GHz towards the target UE.

In a first step, the dual function RAN node chooses a classic OFDM waveform at 60 GHz (e.g. as specified in IEEE802.11ad) as a desired sensing signal for the purpose of detecting the UE's environment and user context, and the RAN node also decides its downlink transmission pattern (e.g. bandwidth/burst duration/strength/period) via a downlink S-RL. In this example, the RAN node treats the communication RL as the master link and the S-RL as the secondary link.

In a second step, the dual functional RAN node allocates the air resources for a sensing signal and configures the target UE with the sensing signal related configuration information via the parallel communication RL at 45 GHz (e.g. RRC procedure signaling), so that the UE knows how/when to receive, measure and react towards the upcoming sensing signal.

In a third step, the dual function RAN node transmits the sensing signal at 60 GHz with the planned pattern, and the UE receives and reflects the sensing signal immediately with a one pulse/shot echo signal in response to one pulse/shot sensing signal as configured by the RAN node.

In a fourth step, after a short latency, the dual function RAN node receives the corresponding echo signal(s) via uplink S-RL from the target UE, and the dual function RAN node further analyzes the sensing results to identify/determine the UE is in an indoor environment and also to identify/determine the user context of the UE.

In a fifth step, the dual function RAN node uses the determined UE indoor environment and user context obtained via S-RL to improve the local beam management for the target UE. In a sixth step, the dual function RAN node may deconfigure or reconfigure the sensing operations with the target UE per its internal policy.

Example 2

Below is a second example use case of a dual function RAN node. The dual function RAN node supports wireless communication at 28 GHz and wireless sensing at 28 GHz, both in mmWave frequency bands. The target UE is in an RRC_Connected state (signaling ongoing data transfer) and in a stadium environment, so a crowd may cause interference to the existing communication RL at 28 GHz. In order to better manage the serving beams (e.g. provide more reliable and efficient beams in time), the dual function RAN node decides to configure and activate the sensing function at 28 GHz towards the target UE.

In a first step, the dual function RAN node chooses the customized 5G-NR OFDM waveform at 28 GHz (e.g. as specified in 3GPP) as the desired sensing signal for the purpose of detecting the UE's environment and user context, and the RAN node also decides its downlink transmission pattern (e.g. bandwidth/burst duration/strength/period) via downlink S-RL. In this example, the RAN node treats the communication RL as the master link and the S-RL as the secondary link.

In a second step, the sensing signal shares the same air resources as the communication RL's, and the dual function RAN node needs not allocate additional air resources for the sensing signal, but still configures the target UE with the sensing signal related configuration information via the parallel communication RL at 28 GHz (e.g. RRC procedure signaling), so that the UE knows how/when to receive, measure and react towards the upcoming sensing signal.

In a third step, the dual function RAN node transmits the sensing signal at 28 GHz physically together with the downlink data transfer signal via a downlink S-RL, and the UE identifies the sensing signal initially and reflects them, one pulse/shot echo signal as a response to a one pulse/shot sensing signal as configured by the RAN node.

In a fourth step, after a short latency, the dual function RAN node receives the corresponding echo signal(s) physically together with the uplink data transfer signal via an uplink S-RL from the target UE, and the dual function RAN node further analyzes and identifies/determines the sensing results, which determines that the UE is in a stadium environment and provides a user context for the UE.

In a fifth step, the dual function RAN node uses the analysis UE stadium environment and user context obtained via S-RL to improve the local beam management for the target UE. In a sixth step, the dual function RAN node may deconfigure or reconfigure the sensing operations with the target UE per its internal policy.

Example 3

Below is a third example use case of a dual function RAN node that supports wireless communication at 6 GHz and wireless sensing at 6 GHz, both in mmWave low frequency bands. The target UE is in an RRC_Connected state (with ongoing data transfer) and in a moving vehicle environment. The moving vehicle environment includes buildings and trees which may result in interference to the existing communication RL at 6 GHz. In order to better manage the serving beams (e.g. provide more reliable and efficient beams in time), the dual function RAN node decides to configure and activate the sensing function at 6 GHz towards the target UE.

In a first step, the dual function RAN node chooses a legacy Radar Chirp waveform at 6 GHz (e.g. as used in classic radar systems) as the desired sensing signal for the purpose of detecting UE's environment and user context. The RAN node also decides its downlink transmission pattern (e.g. bandwidth/burst duration/strength/period) via downlink S-RL. In this example, the dual function RAN node treats the communication RL as the master link and the S-RL as the secondary link.

In a second step, the sensing signal uses different air resources from the communication RL's in a time division multiplexing ("TDM") manner. The dual function RAN node needs to allocate dedicated air resources for the sensing signal, and also needs to configure the target UE with the sensing signal related configuration information via the parallel communication RL at 6 GHz (e.g. RRC procedure signaling), so that UE knows how/when to receive, measure and react towards the upcoming sensing signal.

In a third step, the dual function RAN node transmits the sensing signal at 6 GHz in a TDM manner (e.g. in different time slots from the downlink data transfer signal via downlink S-RL), and UE identifies the sensing signal first and reflects them in proper time, a one pulse/shot echo signal as response to a one pulse/shot sensing signal as configured by the dual function RAN node.

In a fourth step, after short latency, the dual function RAN node receives the corresponding echo signal(s) in a TDM manner (e.g. in different time slots from the uplink data transfer signal via uplink S-RL from the target UE), and the dual function RAN node further analyzes and identifies/determines the sensing results, such as that the UE is in a moving vehicle and the "UE user context".

In a fifth step, the dual function RAN node uses the UE is in moving vehicle and user context obtained via S-RL to improve the local beam management for the target UE. In a sixth step, the dual functional RAN node may deconfigure or reconfigure the sensing operations with the target UE per its internal policy later on.

Example 4

Below is a fourth example use case of a dual function RAN node that supports wireless communication at 3.5 GHz in low frequency bands and wireless sensing at 60 GHz in mmWave high frequency bands. The target UE is in a RRC_Idle state (without any ongoing data transfer) and in a shopping mall environment. In order to better manage an advertising promotion for different sellers (e.g. provide more targeted information to specific buyers in time), the dual function RAN node decides to configure and activate the sensing function at 60 GHz towards the target UE.

In a first step, the dual function RAN node utilizes the classic OFDM waveform at 60 GHz (e.g. as specified in IEEE802.11ad) as the desired sensing signal for the purpose of detecting UE's presence in particular area (e.g. which shopping room), and the RAN node also decides its downlink transmission pattern (e.g. bandwidth/burst duration/strength/period) via downlink S-RL. In this example, the RAN node uses the S-RL as the master link and the broad/multi-cast communication link as the secondary link.

In a second step, the dual function RAN node allocates the air resources for sensing signal and configures the target UE with the sensing signal related configuration information via the parallel broad/multi-cast communication RL at 3.5 GHz (e.g. SIB signaling), so that the UE knows how/when to receive, measure and react towards the upcoming sensing signal.

In a third step, the dual function RAN node transmits the sensing signal at 60 GHz with the planned pattern, and UE receives and reflects the sensing signal immediately, one pulse/shot echo signal as response to one pulse/shot sensing signal as configured by the RAN node.

In a fourth step, after short latency, the dual function RAN node receives the corresponding echo signal(s) via uplink S-RL from the target UE, and the dual function RAN node further analyzes and identifies/determines the sensing results to become aware of UE's presence in particular shopping room.

In a fifth step, the dual function RAN node uses those identified UE's presence in a particular shopping room obtained via S-RL to improve the advertising promotion for different sellers (e.g. start broad/multi-casting specific info with MBS: Multicast Broadcast Service function).

In a sixth step, the dual function RAN node may deconfigure or reconfigure the sensing operations with the target UE per its internal policy.

Example 5

Below is a fifth example use case of a dual function RAN node that supports wireless communication at 28 GHz and wireless sensing at 28 GHz both in mmWave frequency bands. The target UE is in RRC_Idle state (without any ongoing data transfer) and in a shopping mall environment. In order to better manage an advertising promotion for different sellers (e.g. provide more targeted information to specific buyers in time), the dual function RAN node decides to configure and activate the sensing function at 28 GHz towards the target UE.

In a first step, a dual function RAN node chooses the customized 5G-NR OFDM waveform at 28 GHz (e.g. as specified in 3GPP) as the desired sensing signal for the purpose of detecting a UE's presence in particular area (e.g. which shopping room), and the dual function RAN node also decides its downlink transmission pattern (e.g. bandwidth/burst duration/strength/period) via downlink S-RL. In this example, the dual function RAN node treats the S-RL as the master link and the broad/multi-cast communication link as the secondary link.

In a second step, the sensing signal uses different air resources from the broad/multi-cast communication RL's in TDM manner, the dual function RAN node needs to allocate dedicated air resources for the sensing signal, and also needs to configures the target UE with the sensing signal related configuration info via the parallel broad/multi-cast communication RL at 28 GHz (e.g. SIB signaling), so that the UE knows how/when to receive, measure and react towards the upcoming sensing signal.

In a third step, the dual function RAN node transmits the sensing signal at 28 GHz with the planned pattern, and the UE receives and reflects the sensing signal immediately, one pulse/shot echo signal as response to one pulse/shot sensing signal as configured by the dual function RAN node.

In a fourth step, after short latency, the dual function RAN node receives the corresponding echo signal(s) via uplink S-RL from the target UE, and the dual function RAN node further analyzes and derives out the sensing results, becoming aware of the UE's presence in a particular "shopping room".

In a fifth step, the dual function RAN node uses the detected UE's presence in particular shopping room obtained via S-RL to improve (target) the advertising promotion for different sellers (e.g. start broad/multi-casting specific info with MBS: Multicast Broadcast Service function).

In a sixth step, the dual function RAN node may deconfigure or reconfigure the sensing operations with the target UE per its internal policy later on.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for wireless sensing comprising:

transmitting a sensing signal for providing a sensing purpose; and providing a sensing radio link for a wireless sensing operation, wherein the providing is by a base station and the sensing radio link is configured with a user equipment ("UE"), and the transmitting and the providing are independent of a radio resource channel ("RRC") state of the UE for a communication purpose, wherein the sensing radio link is configured by the base station for providing target UE's environmental or context details to the base station for improving ongoing or upcoming wireless communication between the UE and the base station.

2. The method of claim 1, further comprising:

receiving an echo signal in response to the sensing signal.

3. The method of claim 2, wherein the echo signal is sent from the UE and is processed by the UE locally.

4. The method of claim 3, wherein the processing by the UE includes at least one of reflecting the signal immediately, identifying and then reflecting the signal, or identifying, evaluating and then reflecting the signal.

5. The method of claim 2, wherein the base station configures the UE with dual functions of wireless communication via a communication radio link ("RL") and wireless sensing via a sensing radio link ("S-RL"), wherein the RL and the S-RL are simultaneous.

6. The method of claim 5, wherein the communication radio link and the sensing radio link utilize the same physical resources, such that the sensing and/or echo signal are physically integrated with a parallel communication signal when the UE is in a connected state.

7. The method of claim 5, wherein the communication radio link and the sensing radio link utilize different physical resources, such that the sensing and/or echo signal are physically separated from a parallel communication signal.

8. A method for wireless sensing comprising:

receiving a sensing signal for a sensing purpose;

transmitting an echo signal in response to receipt of the sensing signal; and establishing a sensing radio link for a wireless sensing operation, wherein the receiving and the transmitting is by a user equipment ("UE") and the sensing radio link is established with a base station, and the sensing radio link is independent of a radio resource channel ("RRC") state of the UE for communication purpose, wherein the sensing radio link is configured by the base station for providing target UE's environmental or context details to the base station for improving ongoing or upcoming wireless communication between the UE and the base station.

9. The method of claim 8, wherein the UE is preconfigured by the base station.

10. The method of claim 9, wherein the UE is configured by the base station with dual functions of wireless communication via a communication radio link ("RL") and wireless sensing via a sensing radio link ("S-RL"), wherein the RL and the S-RL are simultaneous.

11. The method of claim 10, wherein the communication radio link and sensing radio link utilize the same physical resources, such that the sensing and/or echo signal are physically integrated with a parallel communication signal.

12. The method of claim 10, wherein the communication radio link and sensing radio link utilize different physical resources, such that the sensing and/or echo signal are physically separated from a parallel communication signal.

13. The method of claim 10, wherein the communication radio link is independent of a RRC state of the UE for communication purpose.

14. The method of claim 8, further comprising:

processing, after receiving the sensing signal, the sensing signal by either being reflected immediately, or identifying and then reflecting the sensing signal, or by identifying, evaluating and then reflecting the sensing signal.

* * * * *